June 9, 1970 M. I. ANDREA Re. 26,909
SHIP'S HULL
Original Filed May 12, 1967
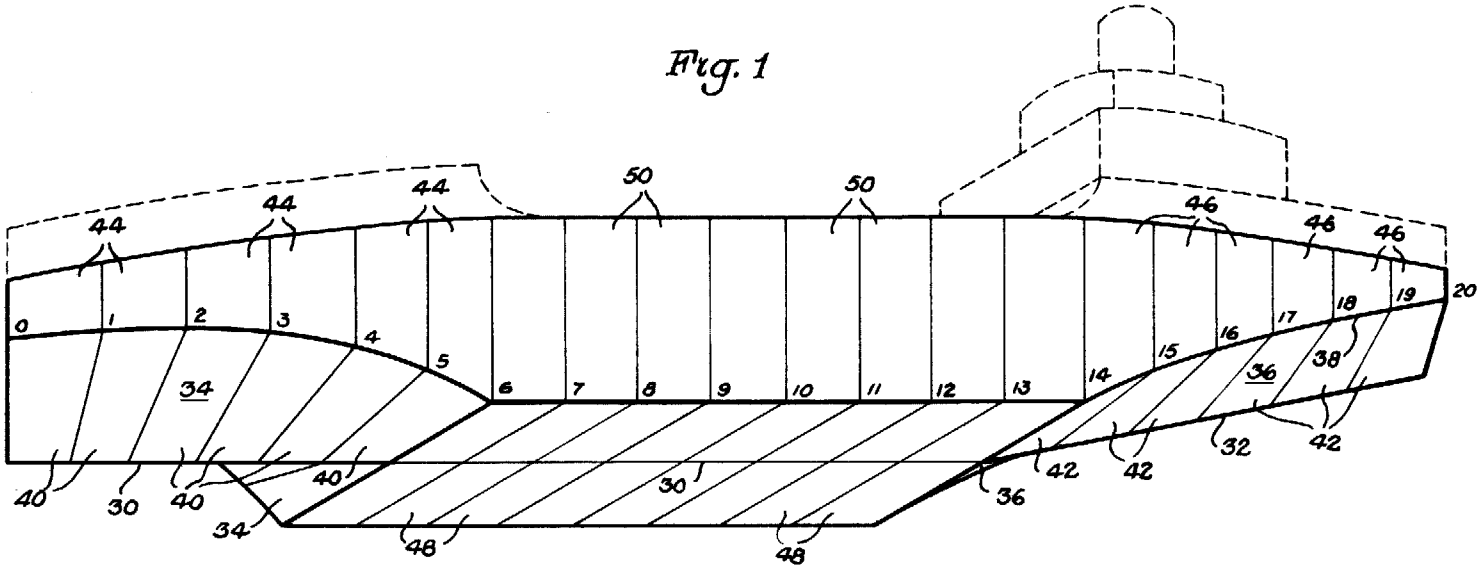
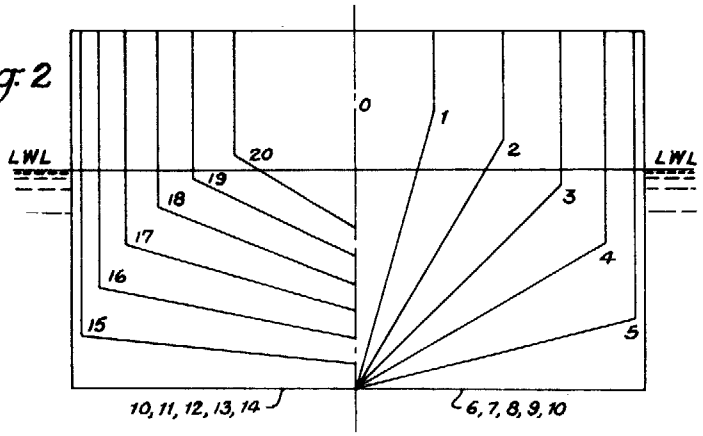
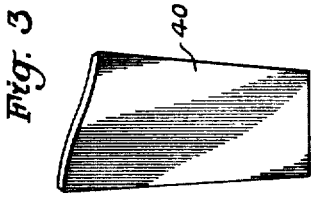
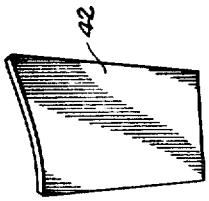
INVENTOR
Mario I. Andrea
BY Alvin J. Englert
AGENT United States Patent Office Re. 26,909
Reissued June 9, 1970

26,909

SHIP'S HULL

Mario I. Andrea, 8900 Brickyard Road,
Potomac, Md. 20854

Original No. 3,439,643, dated Apr. 22, 1969, Ser. No. 638,712, May 12, 1967. Application for reissue May 23, 1969, Ser. No. 835,865
Int. Cl. B63b *1/00, 3/00*
U.S. Cl. 114—63 5 Claims

Matter enclosed in heavy brackets [ ] appears in the original patent but forms no part of this reissue specification; matter printed in italics indicates the additions made by reissue.

ABSTRACT OF THE DISCLOSURE

Frames with *straight* [vertical] upper members and V-shaped lower members, the V-angle from stem aft increasing uniformly from *about* 0° to *about* [–] 180°, remaining at *about* 180°, and then decreasing uniformly towards 0°.

This invention described herein may be manufactured and used by or for the Government of the United States for governmental purposes without the payment to me of any royalty thereon.

BACKGROUND OF THE INVENTION

This invention relates to a ship's hull, and more particularly to an economical, straight-framed hull for cargo ships and the like.

The hulls of cargo ships and the like presently are constructed in accordance with various forms or series that have been developed during the last several decades. As is well known, these series utilize individually curved frames and plates which are inherently expensive to fabricate and fit. Although there have been some efforts to construct hulls with straight frames and flat plates, such hulls have not been widely accepted, because the savings in construction have not offset the increased cost of operating these less efficient hulls.

SUMMARY OF THE INVENTION

This invention provides a straight-framed hull which is highly economical to construct and yet sufficiently economical to operate that a considerable savings in total cost is realized. In accordance with the principles of the invention, the hull is constructed with straight V-frames, and the V-angle from the stem aft is uniformly increased and *about* 0° to *about* [–] 180°, maintained at *about* 180°, and then uniformly decreased towards 0°. This controlled and uniform variation of the V-angle provides at once an economical and efficient hull. The hull is economical to construct because a large proportion of the frames and plates are identical or interchangeable, permitting mass production thereof; and the hull is efficient because the bow and stern portions are helical surfaces which merge smoothly into the middle body portion of the hull.

BRIEF DESCRIPTION OF THE DRAWING

FIG. 1 is a perspective view of a hull embodying the principles of this invention;

FIG. 2 is a body plan of the hull of FIG. 1;

FIG. 3 is a perspective view of a plate for the bow of the hull; and

FIG. 4 is a perspective view of a plate for the stern.

DESCRIPTION OF THE PREFERRED EMBODIMENT

The lines 0–20 in FIGS. 1 and 2 represent the intersections of twenty-one equally spaced transverse planes or stations with a hull constructed in accordance with this invention. The lines 0–10 in the right half of FIG. 2 are the fore body lines, while the lines 10–20 in the left half are the after body lines, in accordance with common naval architectural practice. The load water line is designated as LWL—LWL.

In accordance with this invention, all of the frames have *straight* [vertical] upper members and straight, V-shaped lower members, as shown by lines 0–20. In addition, the V-angles of consecutive, equally spaced frames from the steam aft increase by a first constant angular increment from *about* 0° *to about* [–] 180°, as shown by lines 0–6; remain at *about* 180° for one or more frames, as desired, as illustrated by lines 7–13; and then decrease by a second constant angular increment from *about* 180° towards 0°, as shown by lines 14–20. The frames from stations 0–14 are joined along a horizontal keel 30, while the frames from stations 14–20 are joined along an after keel 32 which is illustrated as having a uniform slope, although it could equally well be horizontal or sloped in a nonuniform manner.

The above-described framing of this invention provides a hull having helical bow and stern surfaces 34 and 36. It may be recalled that a helical surface is generated by a line which is rotated about an end that simultaneously is translated along a directrix. A screw is a common example of a helical surface. Since the lower portions of lines 0–6 are equally spaced along the keel 30, and evenly rotated thereabout, it follows that the framing surface defined thereby is helical. Hence, the bow portion of the hull comprises two quarter-turn, oppositely rotated helical surfaces 34 having a common vertical edge or stem, shown as line 0, and a common horizontal directrix or keel 30.

In similar manner, the lines 14–20, which are evenly spaced along and rotated about the after keel 32, define two oppositely rotated helical stern surfaces 36 having the after keel as a common edge. These helical stern surfaces, which are illustrated as about one-sixth turn each, terminate in a flat transom stern, shown by line 20. The amount of rotation or twist of the helical stern surfaces may of course be modified to suit any selected stern configuration. It is to be noted that the lengths of the lower frame members from stations 14–20 are successively decreased to the length of the lower member of frame 20, so as to form a smoothly curved stern chine line 38.

As mentioned hereinbefore, the helical bow and stern surfaces 34, 36 of this invention provide a highly economical hull. It will be observed that the lower members of the frames from station 0–14 are all straight, and of the same length. Accordingly, these members may be fabricated and fitted in an economical, mass-produced manner. From stations 14–20, the lower frame members are straight, but of successively decreasing length, and therefore require a small amount of individual cutting and fitting. The upper members of all of the frames from stations 0–20 are straight, and the upper members from stations 6–14 are equal in length. These upper members are preferably welded or otherwise joined to their respective lower members. In this manner, the framing of a hull according to this invention avoids the costs normally associated with the bending operations required by prior hull designs.

Considering now the plating fitted to the frames, it will be apparent that the plates 40, FIG. 3, required for the lower frame members from stations 0–6 are all identical. This is because the spacing and rotation between any pair of consecutive frames is identical; or in other words, because equal longitudinal increments of a helical or screw surface are identical. As will readily be appreciated, this feature of the invention greatly reduces the cost of fabricating and fitting the bow plates. Whereas such plates heretofore were individually shaped, often to compound curved surfaces, and individually fitted to the frames, in the practice of this invention the plates 40 are fabricated by mass production, and fitted at random. The plates 40 are slightly keystone shaped, inasmuch as the distance between adjacent frames increases from the keel upwards, due to the rotation of the frames about the keel. The plates 40 are preferably bent or warped a slight amount to form a continuously curved helical surface, although the plates alternatively may be left flat to form a close approximation to a helical surface. The plates 42, FIG. 4, for the lower frame members from stations 14–20 are similarly shaped, although they are of decreasing lengths.

The plates 44 and 46 for the upper members of the frames from stations 0–6 and 14–20, respectively, are slightly cylindrical, or flat if such is suitable.

From stations 6–14, the middle body of the hull, the bottom plates 48 are all flat and identical, and the side plates 50 are also flat and identical.

It will be apparent from the foregoing that the fabrication and fitting of the plates for the hull of this invention is greatly simplified over the corresponding operations for the hulls of the prior art.

The middle body of this invention will be recognized as being parallel, and rectangular in cross section. In addition to being economical to construct, such middle body also provides a maximum cargo volume that is especially adapted to carrying modern containerized cargo.

As stated previously, the present ship's hull is also an efficient hull, because the helical bow and stern surfaces 34, 36 smoothly merge into the flat under portion of the middle body. This can be seen from the smooth rotation of the V-angles of line 0–6 from *about* 0 *to about* [–] 80°, and the smooth decrease of the V-angles of lines 14–20 from *about* 180° towards 0°. Moreover, the helical bow and stern portions 34, 36 of the hull tend to turn the displaced water and guide it smoothly under the ship, in the manner of a screw, thereby minimizing the wave making resistance of the ship.

It will now be clear that the hull of this invention is both economical to construct and operate, thus resulting in a total savings over the lifetime of the ship. The hull is especially suited to medium speed cargo ships such as feeder ships, coastal ships, tankers, bulk carriers and the like.

While the invention has been described and its features explained with reference to a single preferred illustrative embodiment thereof, it is to be understood that the invention is not limited to all the details included for illustration, but only as set forth in the appended claims.

I claim:

1. A ship's hull comprising:

a plurality of frames having *straight* [vertical] upper members and V-shaped lower members, the V-angles of consecutive frames from the stem aft increasing by a first constant angular increment from *about* 0° [–] *to about* 180°, remaining at *said about* 180° for one or more frames, and then decreasing by a second constant angular increment from *said about* 180° towards 0°, whereby said hull was helical bow [surfaces, a flat middle body under surface, helical] *and* stern surfaces [, and vertical side surfaces].

2. A ship's hull as set forth in claim 1, wherein said frames having said increasing and said *about* 180° V-angles are joined along a horizontal keel, said lower V-shaped members of said last-mentioned frames being equal in length.

3. A ship's hull as set forth in claim 2, wherein said frames having said decreasing V-angles are joined along a sloped after keel.

4. A ship's hull as set forth in claim 3, wherein said second constant angular increment is different from said first constant angular increment.

5. A ship's hull as set forth in claim 4, wherein said frames having said decreasing V-angles terminate in a flat transom stern.

References Cited

The following references, cited by the Examiner, are of record in the patented file of this patent or the original patent.

FOREIGN PATENTS 120,467 11/1918 Great Britain.

ANDREW H. FARRELL, Primary Examiner

UNITED STATES PATENT OFFICE

CERTIFICATE OF CORRECTION

Patent No. Re. 26,909 Dated June 9, 1970

Inventor(s) Mario I. Andrea

It is certified that error appears in the above-identified patent and that said Letters Patent are hereby corrected as shown below:

Column 1, lines 19 and 50, "to" should read --to--. Column 2, line 11, "steam" should read --stem--. Column 3, line 34, "0" (second occurrence) should read --$0^{\circ}$--; line 35, "$80^{\circ}$" should read --$180^{\circ}$--. Column 4, line 18, "was" should read --has--.

SIGNED AND SEALED

SEP 29 1970

(SEAL)
Attest:

Edward M. Fletcher, Jr.
Attesting Officer

WILLIAM E. SCHUYLER, JR.
Commissioner of Patents